May 29, 1934.

A. C. FISCHER

Re. 19,183

PREFORMED EXPANSION JOINT

Original Filed March 25, 1925

Inventor.
Albert C. Fischer.
By Albert F. Robinson Atty

Reissued May 29, 1934

Re. 19,183

UNITED STATES PATENT OFFICE 19,183

PREFORMED EXPANSION JOINT

Albert C. Fischer, Chicago, Ill., assignor to The Philip Carey Manufacturing Company, a corporation of Ohio Original No. 1,755,107, dated April 15, 1930, Serial No. 18,330, March 25, 1925. Application for reissue January 6, 1932, Serial No. 585,131

9 Claims. (Cl. 94—18)

My invention relates to a composition of matter which can be utilized in connection with preformed expansion joints which will be elastic at cooler temperatures and ductile at higher temperatures. Various filling means may be utilized in connection with my invention to either regulate the flow of the material or fibrous matter may be added or various particles of shredded paper, felt, roofing, scrap, husk material, etc., may be utilized either in a penetrated or unpenetrated state.

My invention relates primarily to the peculiar quality of the compound and the mixture to bring about the results described.

One of the objects of my invention is to provide a preformed expansion joint having a lower portion of non-oozing material and a crown of differently colored material whereby the crown may be used either to harmonize with the color of the material of which the road is made, or, conversely may be utilized as a marking strip. In the latter instance the color of the crown will be in contrast to that of the material of the roadway.

I find it is desirable to present to the traffic also various colored materials which might be utilized as guide lines, warning lines, and which might be used to harmonize the appearance of the street. This cannot be accomplished readily with bituminous substances, and therefore it is necessary to construct combinations of other substances with waterproofed substances in order to present to the traffic these various colored compositions as part of the marking line, and which may become part of a preformed expansion joint.

This structure may be made up of an entire mass of the ductile substance elastic at cooling temperatures, or it may be part of a crown or the entire crown or traffic edge of a premolded joint, said crown or traffic edge consisting of various colors of this elastic substance ductile at warmer temperatures. This may be either rolled into place by suitable machinery on the preformed expansion joint base or it may be cemented to the preformed expansion joint base by any suitable means, preferably by cementing in a warm state to the base material. The base material need not necessarily be limited to any particular type of construction, but should preferably be a non-oozing structure, so that the crown material will not be pushed out of place.

I therefore do not wish to be limited to any structure of the premoulded material where a combination of a crown and base is required.

Figure 1:
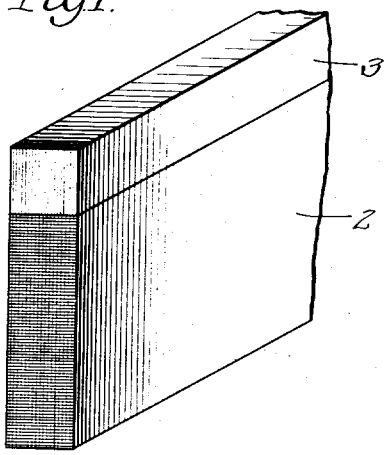
Figure 2:
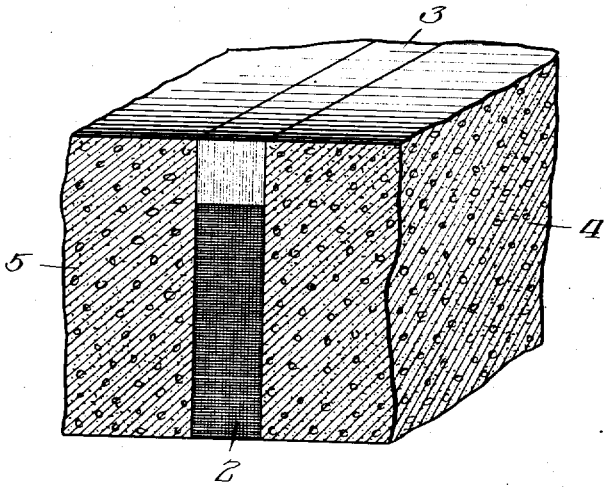

For a better understanding of the invention, reference will be made to the accompanying drawing, in which, Fig. 1 is a perspective view of a section of strip embodying my invention; and Fig. 2 is a view of a paving section in which the strip is inserted.

Referring now to this drawing, the novel and improved product comprises generally a base 2 and elastic crown or cap 3, preferably fabricated into a preformed unitary structure for insertion between rigid elements such as paving slabs 4 and 5.

One method of producing this elastic substance ductile at warmer temperatures is by compounding with 25% rosin, 10% rubber, after cutting the rubber back with kerosene and using a filling material such as barytes, fuller's earth, celite, etc., and any suitable mineral pigment to make the necessary color.

These preparations need not necessarily be observed but may be varied, for instance, the rubber may be added greatly in excess of 10%, the rosin proportionately decreased in quantity and likewise the filler. Likewise the mineral coloring pigment may be increased or decreased as the case may warrant, or old tires and vulcanized rubber may be added to the crude rubber which has been cut back by kerosene and a more elastic nature at cooling temperatures imparted to the product.

I do not wish to be limited as to the degree of elasticity of this material as long as it becomes ductile at warmer temperatures. This ductility may occur at 150°, 125°, or even at temperatures of 200°, and for incorporation of other materials, as high as 300°.

While I have shown a certain specific embodiment for carrying my invention into effect, it is apparent that various changes may be made without departing from the spirit of the invention.

I claim:

1. A preformed expansion joint consisting of a bituminous base material and a crown or wearing edge composed of rosin 30%, crude rubber 10%, vulcanized shredded rubber 15% and filling material 45%.

2. A premolded expansion joint consisting of a bituminous base and a wearing crown consisting of rosin 30%, crude rubber 10%, vulcanized shredded rubber 15% and filling material 45%, mixed with suitable coloring matter.

3. A composite preformed expansion joint adapted for insertion between the adjacent sections of a pavement and consisting of a bituminous base portion and a crown portion of rubber material of contrasting color.

4. A composite preformed expansion joint adapted for insertion between adjacent sections of a pavement and consisting of a bituminous base portion and an integral crown formed of a composition comprising rubber, rosin, and a mineral coloring material.

5. A composite preformed expansion joint adapted for insertion between the sections of a concrete pavement, and consisting of a bituminous base and an integral crown or wearing edge comprising rubber, rosin, and a filler adapted to color the crown to contrast with the pavement in order to provide a combined marker and expansion joint.

6. A preformed expansion joint adapted for insertion between adjacent sections of a pavement and having a lower bituminous body portion and an upper or exposable body portion of elastic waterproofing material.

7. A preformed expansion joint adapted for insertion between adjacent sections of a pavement and having a lower bituminous portion and an upper or exposable portion containing rubber.

8. A preformed expansion joint adapted for insertion between adjacent sections of a pavement comprising separately formed strips, one of which is of bituminous composition and the other of which contains rubber.

9. A preformed expansion joint adapted for insertion between adjacent sections of a pavement comprising separately formed strips, one of which is of bituminous composition and the other of which contains rubber, and means for securing the strips in superimposed relation.

ALBERT C. FISCHER.